US012068612B2

United States Patent
Lee

(10) Patent No.: US 12,068,612 B2
(45) Date of Patent: *Aug. 20, 2024

(54) WEARABLE CHARGING UNIT AND SYSTEM

(71) Applicant: T-MOBILE INNOVATIONS LLC, Overland Park, KS (US)

(72) Inventor: Sang Jun Lee, Kirkland, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,289

(22) Filed: Jun. 26, 2023

(65) Prior Publication Data
US 2024/0039330 A1  Feb. 1, 2024

Related U.S. Application Data

(63) Continuation of application No. 17/558,885, filed on Dec. 22, 2021, now Pat. No. 11,722,005.

(51) Int. Cl.
*H02J 50/00* (2016.01)
*G06F 1/16* (2006.01)
*H02J 7/00* (2006.01)
*H02J 7/34* (2006.01)
*H02J 50/10* (2016.01)

(52) U.S. Cl.
CPC ............ *H02J 50/005* (2020.01); *G06F 1/163* (2013.01); *H02J 7/0044* (2013.01); *H02J 7/342* (2020.01); *H02J 50/10* (2016.02)

(58) Field of Classification Search
CPC ........ H02J 50/005; H02J 7/0044; H02J 7/342; H02J 50/10; G06F 1/163
See application file for complete search history.

(56) References Cited

U.S. PATENT DOCUMENTS

| 10,139,859 | B2 | 11/2018 | von Badinski et al. | |
|---|---|---|---|---|
| 2016/0091922 | A1* | 3/2016 | Nazzaro | G04C 10/00 307/104 |
| 2016/0196550 | A1* | 7/2016 | Chaudhry Basit | G07F 7/0833 705/41 |
| 2017/0033567 | A1* | 2/2017 | Adamisin | H02J 50/402 |
| 2017/0040825 | A1* | 2/2017 | Cavallaro | H02J 50/10 |
| 2018/0323636 | A1* | 11/2018 | Makwinski | H02J 7/0042 |
| 2019/0368656 | A1* | 12/2019 | Xu | G06F 3/011 |

* cited by examiner

*Primary Examiner* — Lincoln D Donovan
*Assistant Examiner* — Tyler J Pereny
(74) *Attorney, Agent, or Firm* — Shook, Hardy & Bacon L.L.P.

(57) ABSTRACT

A wearable device charging system comprising a base station and a wearable charging unit. The wearable charging unit configured to couple with, and charge, a wearable item while the wearable item is in an as-worn position. The wearable charging unit comprising a housing, a battery, and a charging system. The charging system may comprise an inductive charging system or a conductive charging system. The base station including a charging system for charging the wearable charging unit and a power input for coupling with an external power supply.

18 Claims, 6 Drawing Sheets

WEARABLE CHARGING UNIT AND SYSTEM

This application is a continuation of U.S. patent application Ser. No. 17/558,885, filed Dec. 22, 2021, and entitled "Wearable Charging Unit and System," the entirety of which is hereby incorporated by reference.

BACKGROUND

Many wearable devices require power, which is often supplied by a rechargeable battery. Typically, the rechargeable battery of a wearable device would be charged by the wearer doffing the wearable device and coupling it to a charging system (e.g., a charging cord plugged into an outlet). In some circumstances, however, it is undesirable for a wearer to doff a wearable device. For example, the wearable device may be a monitoring device that monitors a physical condition of the wearer or the wearable device may be an emergency communication device that permits the wearer to contact help in an emergency situation. In either of these examples, having the wearer remove the wearable device in order to recharge the battery is undesirable and can even be unsafe. Further, connecting the wearable device to a traditional charging cord while the device is donned significantly restricts the mobility of the wearer. Moreover, the wearer is often uncomfortable maintaining, and/or unable to maintain, proximity to a power outlet for the amount of time necessary to provide a useful charge to the wearable device.

SUMMARY

At a high level, aspects described herein relate to a wearable charging unit and system configured to recharge a wearable item without the wearer removing the wearable item. The wearable charging unit may include a housing having a battery and a charging system. The housing may be configured to removably couple with the wearable item, and charge the battery of the wearable item, while the wearable item is in an as-worn position. In some aspects, the charging system comprises an inductive charging system for wirelessly charging the wearable item. In other aspects, the charging system comprises a conductive charging system. A wearable device charging system may include the wearable charging unit and a base station configured to charge the wearable charging unit when it is uncoupled from the wearable item. In some aspects, the base station may be configured to charge both the wearable charging unit and the wearable item at the same time.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed, unless and except when the order of individual steps is explicitly stated.

As used herein, the term "charge" refers to supplying power to a device. More specifically, to "charge" a device, as used herein, is to increase a supply of power stored in a rechargeable battery of said device. Throughout this disclosure, reference to "charging" a device includes increasing a supply of power stored in a battery on-board said device.

At a high level, aspects described herein relate to a wearable charging unit and system configured to recharge a wearable item without the wearer removing the wearable item. The wearable charging unit may include a housing having a battery and a charging system. The housing may be configured to removably couple with the wearable item, and charge the battery of the wearable item, while the wearable item is in an as-worn position. In some aspects, the charging system comprises an inductive charging system for wirelessly charging the wearable item. In other aspects, the charging system comprises a conductive charging system. A wearable device charging system may include the wearable charging unit and a base station configured to charge the wearable charging unit when it is uncoupled from the wearable item. In some aspects, the base station may be configured to charge both the wearable charging unit and the wearable item at the same time.

Figure 1:
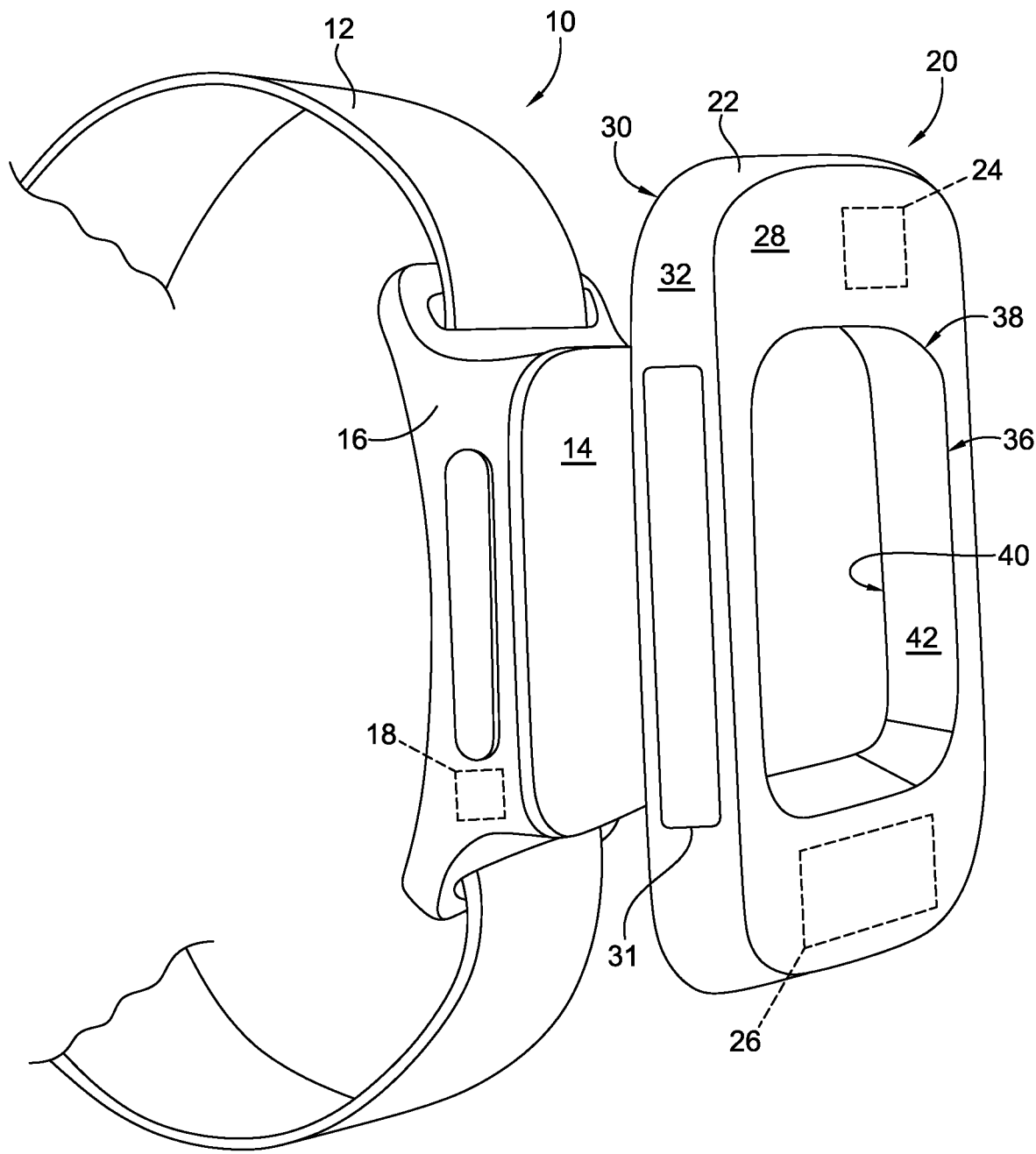
FIG. 1 depicts a perspective view of a wearable item and a wearable charging unit, in accordance with aspects herein.
Figure 2:
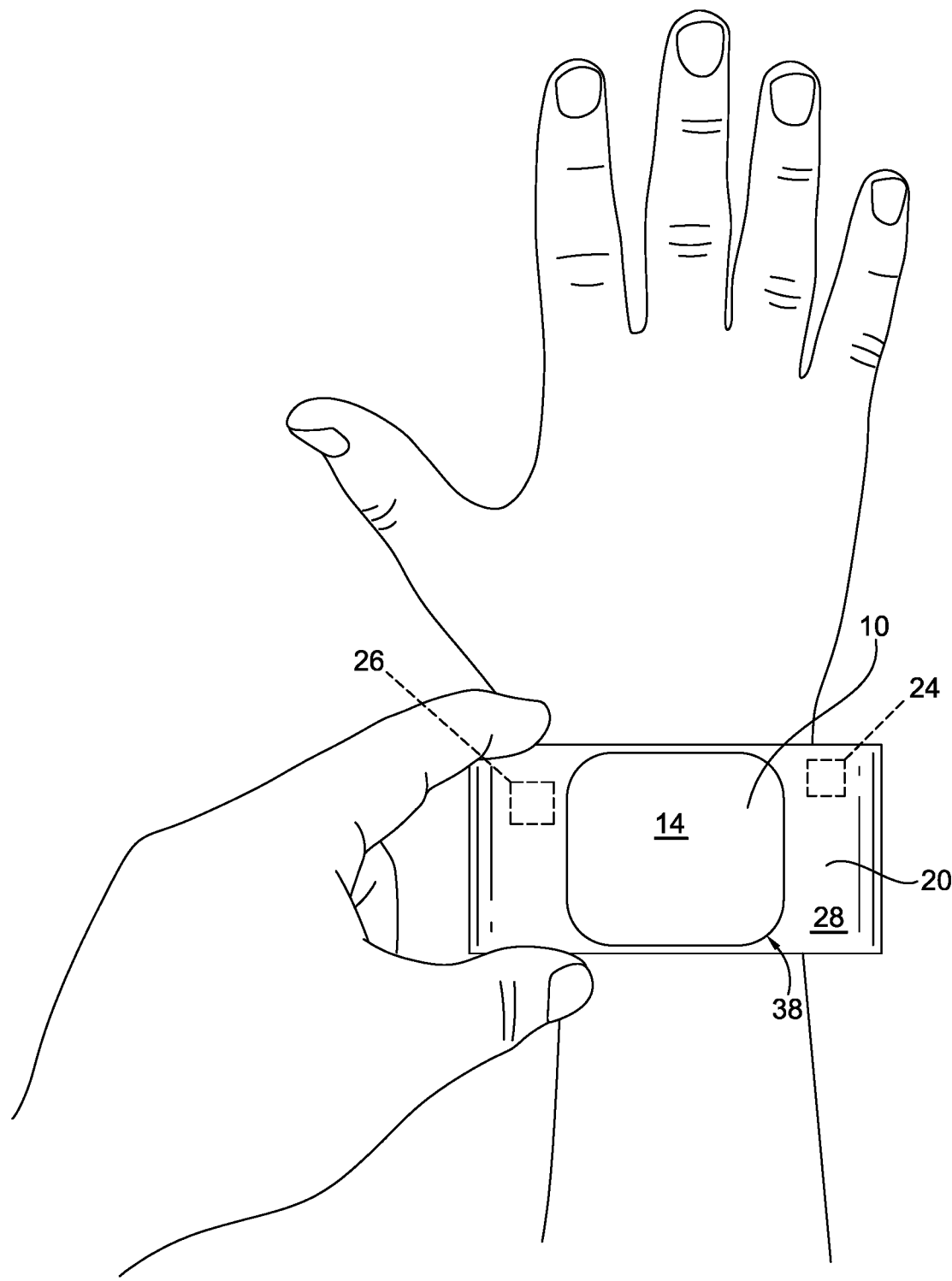
FIG. 2 depicts a top view of the wearable charging unit removably coupled to the wearable item of FIG. 1 in an as-worn position, in accordance with aspects herein.

Turning now to FIG. 1, a wearable item 10 is depicted as a watch. The wearable item 10 includes a strap 12, a face 14, a body 16, and a battery 18 contained within the body 16. When in an as-worn position (e.g., when donned by a wearer, as seen in FIG. 2), the wearable item may be worn proximate a wrist of the wearer. Although depicted as a watch, the wearable item 10 may comprise any other type of wearable device (e.g., a pendant, a clasp for a belt or pocket, etc.). In aspects, the wearable item 10 is configured to monitor a wearer's medical condition and communicate it to a monitoring station In other aspects, the wearable item 10 is configured to provide a user input that allows the wearer to communicate with parties in other locations. For example, a wearer could request assistance in case of emergency. By way of another example, a wearer could communicate via the wearable item 10 with a person located elsewhere in a non-emergency situation. The battery 18 may comprise any suitable rechargeable battery. For example, the battery 18 may comprise a lithium-ion battery.

Also shown in FIG. 1 is an aspect of a wearable charging unit 20. The wearable charging unit 20 includes a housing 22, a battery 24 within the housing 22, and a charging system 26 within the housing 22. In further aspects, the wearable charging unit 20 may include more than one battery 24. For example, a battery 24 could be positioned on both ends of the wearable charging unit 20. The housing 22 may be made of any suitable material. In some aspects, the housing 22 may comprise a polymer. In other aspects, the housing 22 may comprise a metal. In the illustrated aspect, the housing 22 has a rounded rectangular shape. In other apsects, the housing 22 may have any other geometric shape.

Figure 3:
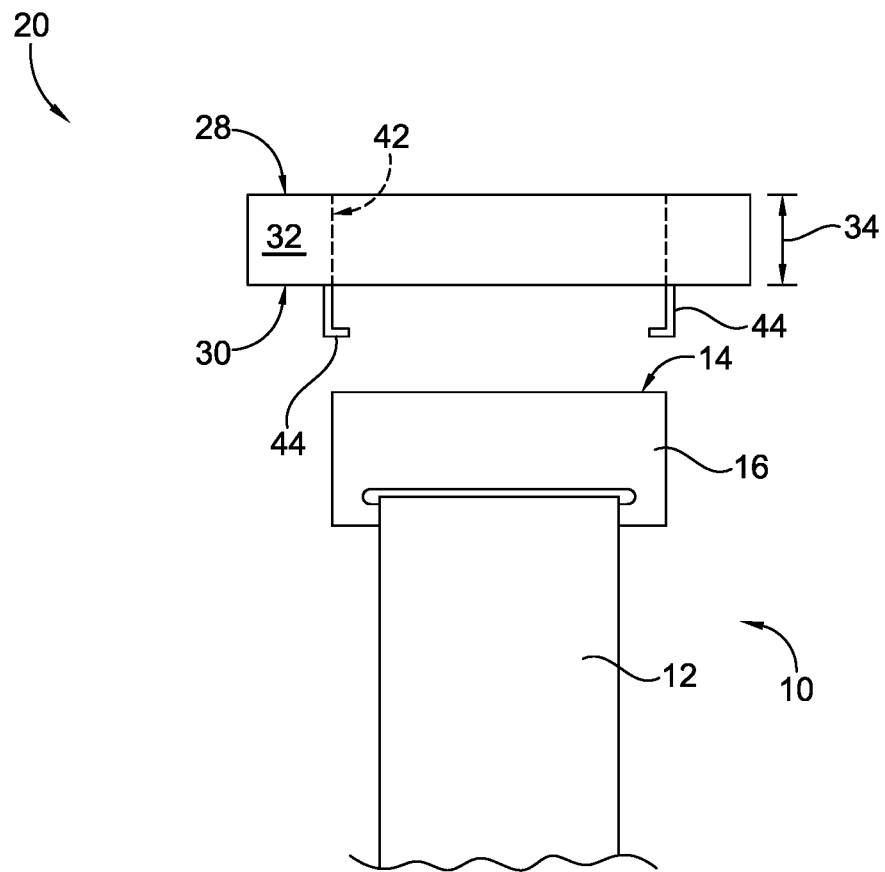
FIG. 3 depicts a side view of the wearable item and the wearable charging unit of FIG. 1, in accordance with aspects herein; herein.

The housing 22 is formed to have a complementary shape to the body 16 of the wearable item 10. The housing 22 may have a first surface 28, a second surface 30 (obscured in FIG. 1) that is opposite the first surface 28, and a side surface 32 around the perimeter of the housing 22. The housing 22 has a thickness 34 (best seen in FIG. 3) extending between the first surface 28 and the second surface 30. In the aspect shown in FIG. 1, a cavity 36 is formed in the housing 22. The cavity 36 extends through the thickness 34 of the housing 22 from a first opening 38 formed in the first surface 28 to a second opening 40 formed in the second surface 30. A cavity surface 42 extends around the cavity 36 between the first opening 38 and the second opening 40. In accordance with some aspects, the geometry to of the cavity 36 is reciprocal to a geometry of the body 16 of the wearable item 10. Thus, when the housing 22 is coupled to the wearable item the cavity surface 42 may be flush with a surface of the body 16 of the wearable item 10.

In aspects, the wearable charging unit 20 may be removably coupled to the wearable item 10 when it is desired to charge the wearable item 10. The removable coupling between the wearable charging unit 20 and the wearable item 10 may be accomplished in many different ways. In aspects, one or more of the wearable item 10 and the wearable charging unit 20 may include a magnet. For example, the magnet may removably couple the housing 22 may be magnetically coupled to the wearable item 10. In other aspects, the shape of the housing 22 may provide a mechanical coupling between the wearable charging unit 20 and the wearable item 10. For example, the housing 22 may include a pair of flanges 44 (shown in FIG. 3) that retain the wearable charging unit 20 in proximity to the wearable item 10 when coupled. Other types of interconnections between the wearable charging unit 20 and the wearable item 10 are contemplated to provide a removable coupling therebetween.

In still other aspects, the wearable charging unit 20 may be fastened to the wearable item 10 with a fastener. For example, mechanical fasteners such as hooks and loops, buttons, straps, pins, screws, etc. may be used to removably couple the wearable charging unit 20 to the wearable item 10. The type of coupling and the snugness of the coupling may be dictated by the type of charging to be used, as discussed below. For example, if inductive charging is to be used, a less snug fit between the wearable charging unit 20 and the wearable item 10 may be sufficient. On the other hand, if conductive charging is to be used a more snug fit between the wearable charging unit 20 and the wearable item 10 may be necessary to maintain contact between the conducting elements. In yet other aspects, the wearable charging unit 20 may include a wristband that holds the wearable charging unit 20 in proximity to the wearable item 10 (e.g., adjacent to the wearable item, over the wearable item, etc.).

When coupled to the wearable item 10, the wearable charging unit 20 may permit the wearer to continue to use the wearable item 10. In some aspects, the first surface 28 of the housing 22 may be co-planar with the face 14 of the wearable item 10. In other aspects, the wearable item 10 may be received within the cavity 36 such that a wearer may interact with the face 14 and/or body 16 through the first opening 38 in the housing 22.

The charging system 26 may comprise an inductive charging system or a conductive charging system. In aspects having an inductive charging system, the charging system 26 may have a transmitter coil in electrical communication with the battery 24. The transmitter coil may supply a magnetic field to a receiver coil present in the wearable item 10 in a manner as is generally known in the art. Further aspects of the charging system 26 may have a controller and one or more sensors. The one or more sensors may be configured to detect when a receiving coil is within range of the charging system 26 and the controller may instruct communication of power from the battery 24 to the charging system 26 based upon such detection.

In aspects having a conductive charging system, the charging system 26 may include a pin array positioned on the housing 22. The pin array may be configured to mate with an input port on the wearable item 10 (e.g., a male/female pin system). The pin array may include one or more POGO pins, in some aspects. Alternatively, the charging system 26 may include an input port configured to receive one or more pins of a pin array positioned on the wearable item 10. In aspects having a pin array and an input port, these features may provide a removable coupling between the wearable item 10 and the wearable charging unit 20.

In other aspects having a conductive charging system, the charging system 26 may include a charging board positioned on the housing 22. The charging board may be configured for delivering power to a receiver positioned on the wearable item 10. For example, when the wearable charging unit 20 is removably coupled to the wearable item 10, the charging board is in physical contact with the receiver in these aspects.

Figure 7A:
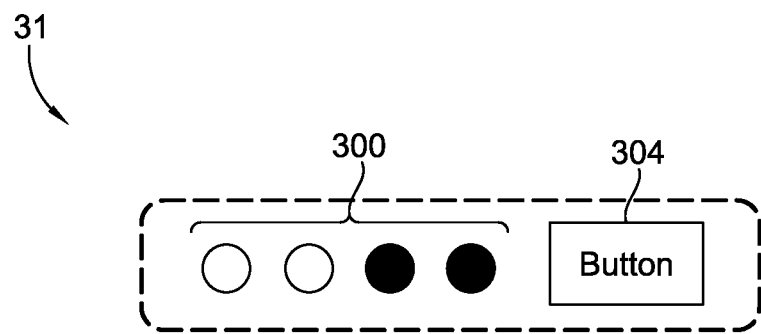
FIGS. 7A-7B depict side views of the wearable item with a power supply status indicator, in accordance with aspects herein.
Figure 7B:

The wearable charging unit 20 may include a power supply status indicator 31. The power supply status indicator may be present on any side of the wearable charging unit 20. For example, the wearable charging unit 20 shown in FIG. 1 includes the power supply status indicator 31 on the side surface 32. Other aspects may include the power supply status indicator 31 on the first surface 28. Turning to FIGS. 7A and 7B, the power supply status indicator 31 may comprise a row of LED lights 300. For example, the row of LED lights 300 may include three, four, or five LED lights linearly aligned. When the wearable charging unit 20 is fully charged, all of the row of LED lights 300 may illuminate. Likewise, when the wearable charging unit 20 is partially charged, some of the row of LED lights may illuminate and some may not illuminate. Other aspects may include a LED illumination bar 302. The LED illumination bar 302 may illuminate only a fraction of the total bar that is representative of the ration of power remaining in the wearable charging unit 20 relative to the total power storage capacity in the wearable charging unit 20. In some aspects, the LED illumination bar 302 may include one or more LEDs configured to emit one or more of red, green and blue light. These different shades of light may correspond to different conditions of the wearable charging unit 20. For example, a green light may correspond to a fully charged, more than half-full charge, more than 20% charged condition of the wearable charging unit 20, in some aspects. A red light may correspond to a less than half-full charge, a less than 20% charged, or a less than 10% charged condition of the wearable charging unit 20. A blue light may correspond to the wearable charging unit 20 receiving a charge to increase the power stored therein.

In some aspects, the power supply status indicator 31 is illuminated at all times when power is remaining in the wearable charging unit 20. In other aspects, the power supply status indicator 31 is only illuminated for a period of time following activation. For example, the power supply status indicator 31 may include a button 304. When button 304 is pressed, the power supply status indicator 31 may become illuminated for a period of time (e.g., 20 seconds). In other aspects, the power supply status indicator 31 may include a touch sensor 306. The touch sensor 306 may provide a similar result as the button 304. For example, the touch sensor 306 may activate an illumination of the power supply status indicator 31.

Figure 4:
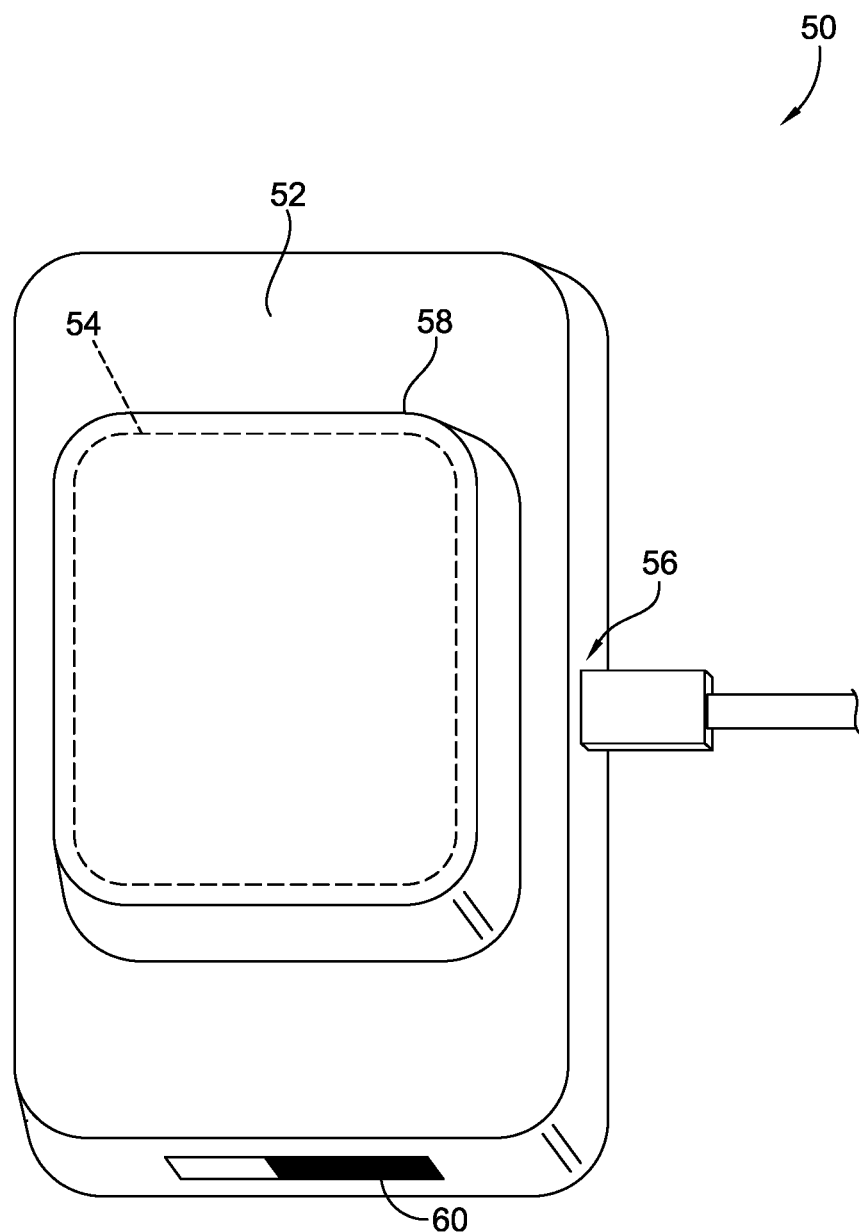
FIG. 4 depicts a perspective view of a base station, in accordance with aspects herein.

Referring now to FIG. 4, a wearable device charging system may include both the wearable charging unit 20 and a base station 50. The base station 50 may be configured to charge the wearable charging unit 20 when the wearable charging unit is proximate to the base station 50 (e.g., when it is not in the as-worn position). The base station 50 may include a housing 52 containing a charging system 54 and an input port 56. In aspects, the housing 52 may include a projection 58 that has a similar geometry to the body 16 of the wearable item. In other aspects, the housing 52 has a planar configuration.

The charging system 54 of the base station 50 may comprise an inductive charging system or a conductive charging system, similar to the inductive and conductive charging systems described above. For example, the charging system 54 may comprise an inductive charging system having a transmitter coil in electrical communication with a power supply. The transmitter coil may supply a magnetic field to a receiver coil present in the wearable charging unit 20. Further aspects of the charging system 54 may have a controller and one or more sensors. The one or more sensors may be configured to detect when a receiving coil is within range of the charging system 54 and the controller may instruct communication of power from the battery 24 to the charging system 54 based upon such detection.

In other aspects, the charging system 54 may comprise a conductive charging system similar to the system described above. For example, the base station 50 may include a pin array or an input port configured to receive a pin array. Likewise, the base station 50 may include a charging board configured to contact a receiver positioned on the housing 22 of the wearable charging unit 20 when the base unit 50 charges the wearable charging unit 20.

Power may be supplied to the base station through the input port 56 by conventional means. For example, a power cord coupled to an external power supply may mate with the input port 56 to communicate power to the base station 50.

The base station 50 may be configured to charge both the wearable item 10 and the wearable charging unit 20. For example, if the wearable charging unit 20 exhausts its power supply (e.g., left uncharged, expends all stored power, etc.) before charging, or fully charging, the wearable item 10, then both the wearable charging unit 20 and the wearable item 10 may be placed on, or in proximity to, the base station 50. Thus, in some aspects, the charging system 54 of the base station 50 may charge both the wearable charging unit 20 and the wearable item 10 at the same time.

The base station 50 may include a charging status indicator 60 configured for providing an indication of a charging status of the base station 50, a power supply level of the wearable charging unit 20, a time remaining to fully charge the wearable charging unit 20, or any combination thereof. In some aspects, the charging status indicator 60 comprises a row of LEDs. In other aspects, the charging status indicator 60 comprises a LED bar positioned a surface of the base station 50. The LED bar may be illuminated in proportion to the amount of time remaining to fully charge the wearable charging unit 20. For example, as the time remaining to fully charge the wearable charging unit 20 decreases, the amount of the LED bar that is illuminated increases. Thus, in this way a time remaining to fully charge the wearable charging unit 20 may be indicated. Similarly, a power supply level of the wearable charging unit 20 may be indicated graphically by the amount of the LED bar that is illuminated.

The base station 50 may emit one color light when charging the wearable charging unit 20 and a different color of light when charging the wearable item 10. When the charging is completed, the base station 50 may discontinue emitting light, in accordance with some aspects. In other aspects, the base station 50 may emit a first color (e.g., red) of light to indicate that the base station 50 is in an idle mode but ready to charge (e.g., the base station is receiving power from an external power supply). In these aspects, the base station 50 may emit a second color (e.g., yellow) to indicate that the base station 50 is providing charging to an item. Further, the base station 50 may emit a third color (e.g., green) when the item is fully charged.

Figure 5:
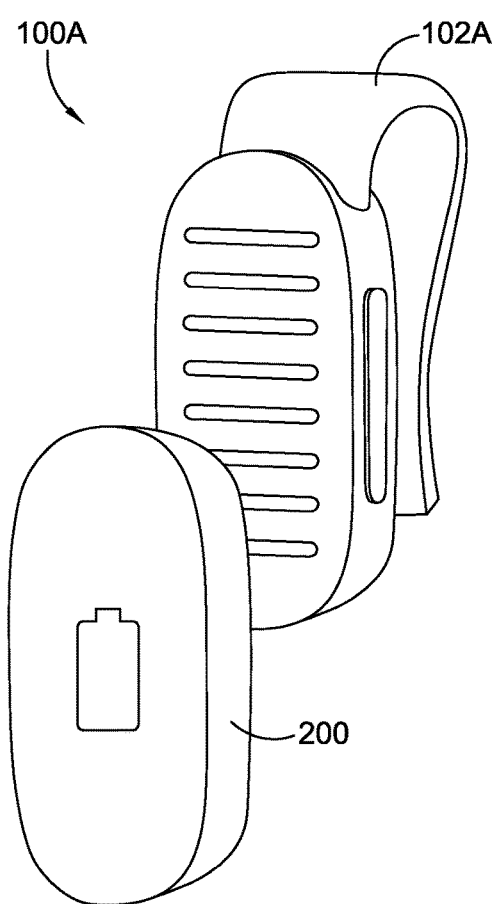
FIG. 5 depicts a perspective view of another wearable item and a wearable charging unit, in accordance with aspects herein.
Figure 6:
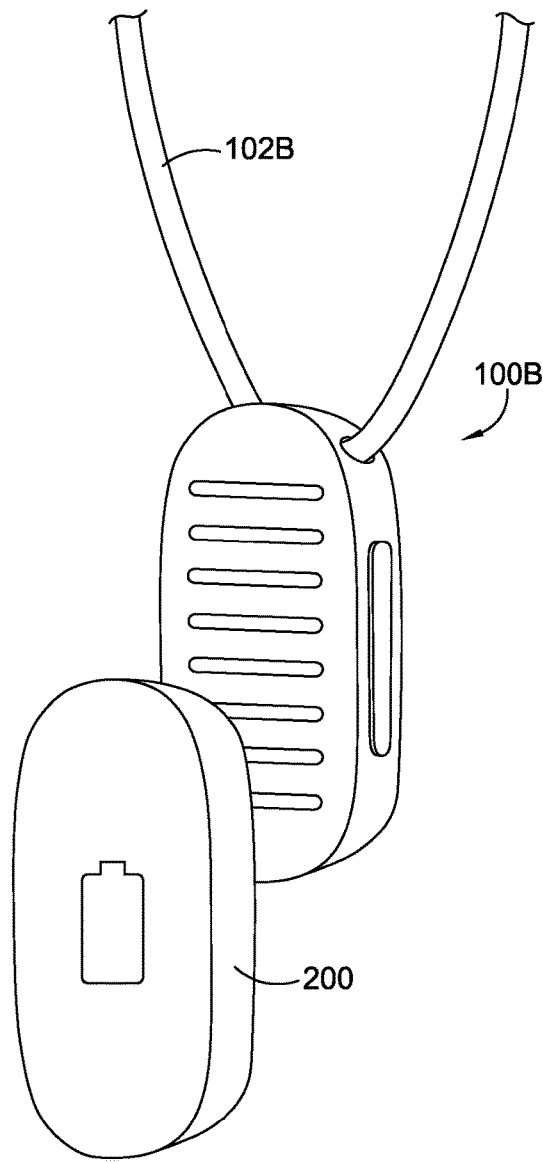
FIG. 6 depicts a perspective view of another wearable item and a wearable charging unit, in accordance with aspects herein.

Turning now to FIGS. 5 and 6, alternative wearable items 100A and 100B, respectively, are illustrated with an alternative wearable charging unit 200. In these aspects, the wearable item 100A or 100B are configured to be worn in different locations by the wearer. For example, the wearable item 100A includes a clip 102A that allows the wearable item 100A to be secured to an edge of an article worn by the wearer (e.g., a belt, a pocket, etc.). Similarly, the wearable item 100B includes a necklace 102B that allows the wearable item 100A to be worn around a neck of a wearer. In both cases, the wearable charging unit 200 functions as described above in reference to the wearable charging unit 20. The primary difference between the two wearable charging units is the absence of a cavity in the wearable charging unit 200. For wearable items that do not have an interactive face (e.g., wearable items 100A and 100B), it is not necessary to provide access through a cavity formed in the wearable charging unit 200. The wearable charging unit 200 may be removably coupled to either of the wearable items 100A or 100B in substantially the same way described above in reference to the wearable charging unit 20.

Additionally, although some exemplary implementations of the embodiments described herein are shown in the accompanying figures, these implementations are not intended to be limiting. Rather, it should be understood that the various embodiments and aspects described herein may be implemented upon any mower having a cutting deck suspended therefrom.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed is:

1. A charging unit for a wearable item, the charging unit comprising:
   a housing having a first surface opposite a second surface and a thickness between the first surface and the second surface, a battery and a charging system, the charging system electrically coupled to the battery,
   wherein the housing is configured to removably couple with, and charge, the wearable item while the wearable item is in an as-worn position; and
   wherein a face of the wearable item is coplanar to the first surface of the housing when the housing is removably coupled to the wearable item.

2. The charging unit of claim 1, wherein the first surface and the second surface have a rounded rectangular shape.

3. The charging unit of claim 1, wherein an aperture extends through the housing from the first surface to the second surface.

4. The charging unit of claim 3, wherein the aperture receives a face of the wearable item when the housing is removably coupled to the wearable item.

5. The charging unit of claim 3 further comprising the housing having a first lip and a second lip each projecting from the second surface and away from the first surface, the first lip and the second lip configured to hold the housing proximate to the wearable item.

6. The charging unit of claim 3 further comprising the housing having a clasp extending from the second surface and away from the first surface, the clasp configured to hold the housing proximate to the wearable item.

7. The charging unit of claim 1 further comprising the housing having a magnetic coupling portion for magnetically coupling to the wearable item while the wearable item is in an as-worn position.

8. The charging unit of claim 1, wherein the charging system comprises an inductive charging system having a transmitter coil.

9. The charging unit of claim 1, wherein the charging system comprises a conductive charging system.

10. The charging unit of claim 9 further comprising the conductive charging system having a pin array for coupling to an input port of the wearable item.

11. The charging unit of claim 9 further comprising the conductive charging system having a charging board for delivering power to a receiver of the wearable item.

12. The charging unit of claim 1 further comprising a controller and one or more sensors, the one or more sensors configured to detect a presence of the wearable item and communicate a presence indication to the controller, the controller configured to instruct power to be supplied from the battery to the charging system.

13. The charging unit of claim 1 further comprising a receiving coil electrically coupled to the battery, the receiving coil configured to receive a magnetic field, generate a current and charge the battery.

14. The charging unit of claim 1 further comprising the housing having a receiving port configured to couple to an external power supply, the receiving port being electrically coupled to the battery.

15. A wearable device charging system comprising:
   a base station comprising:
   (1) an input port for receiving power from an external power supply;
   (2) a first charging system in electrical communication with the input port;
   (3) one or more sensors configured to detect when a wearable charger is proximate the base station and communicate a presence indication to a controller; and
   (4) the controller configured to instruct power to be supplied from the input port to the first charging system based upon the presence indication;
   the wearable charger comprising:
   (1) a housing having a first surface, a second surface, and a thickness therebetween;
   (2) a battery;
   (3) a second charging system, the second charging system electrically coupled to the battery;
   (4) one or more sensors configured to detect when the wearable charger is proximate a wearable item and communicate a presence indication to a second controller; and
   (5) the second controller configured to instruct power to be supplied from the battery to the second charging system,
   wherein the wearable charger is configured to removably couple with, and charge, the wearable item while the wearable item is in an as-worn position; and
   wherein a face of the wearable item is coplanar to the first surface of the housing when the housing is removably coupled to the wearable item.

16. The wearable device charging system of claim 15 further comprising the wearable charger having a receiving coil configured to receive an inductive charge from a transmission coil of the first charging system.

17. The wearable device charging system of claim 15 further comprising the base station having a pin array electrically coupled to the first charging system and the wearable charger having a second input port configured to receive the array of pin array, the second input port electrically coupled to the battery.

18. The wearable device charging system of claim 15 further comprising a cable received by the input port of the base station and configured to transmit power to the base station from the external power supply.

* * * * *